United States Patent
Wang

(10) Patent No.: US 10,379,884 B2
(45) Date of Patent: Aug. 13, 2019

(54) COMMUNICATION METHOD AND APPARATUS, AND ELECTRONIC DEVICE AND PROGRAM PRODUCT THEREOF

(71) Applicant: CloudMinds (Shenzhen) Robotics Systems Co., Ltd., Beijing (CN)

(72) Inventor: Yonghui Wang, Beijing (CN)

(73) Assignee: CLOUDMINDS (SHENZHEN) ROBOTICS SYSTEMS CO., LTD., Beijing (CN)

( * ) Notice: Subject to any disclaimer, the term of this patent is extended or adjusted under 35 U.S.C. 154(b) by 0 days.

(21) Appl. No.: 15/517,408

(22) PCT Filed: Mar. 25, 2016

(86) PCT No.: PCT/CN2016/077391
§ 371 (c)(1),
(2) Date: Apr. 6, 2017

(87) PCT Pub. No.: WO2017/161572
PCT Pub. Date: Sep. 28, 2017

(65) Prior Publication Data
US 2019/0004832 A1    Jan. 3, 2019

(51) Int. Cl.
*G06F 9/46* (2006.01)
*G06F 9/455* (2018.01)
*H04W 88/06* (2009.01)

(52) U.S. Cl.
CPC .......... *G06F 9/455* (2013.01); *G06F 9/45533* (2013.01); *G06F 9/45558* (2013.01);
(Continued)

(58) Field of Classification Search
CPC ................... G06F 9/455; H04W 88/06
See application file for complete search history.

(56) References Cited

U.S. PATENT DOCUMENTS 8,255,565 B2 * 8/2012 Kim .............. H04L 67/104
709/205
8,966,004 B2  2/2015 Connelly
(Continued)

FOREIGN PATENT DOCUMENTS

CN    102065161 A    5/2011
CN    103067593 A    4/2013
(Continued)

OTHER PUBLICATIONS

International Search Report in international application No. PCT/CN2016/077391, dated Oct. 9, 2016.
(Continued)

*Primary Examiner* — Camquy Truong
(74) *Attorney, Agent, or Firm* — Syncoda LLC; Feng Ma

(57) ABSTRACT

The present application provides a communication method and apparatus, and an electronic device and program product thereof. The method includes: acquiring a communication request of a first virtual machine application, packaging the communication request on a second virtual machine, and sending the packaged communication request to a communication component; and/or receiving communication data sent by a communication component, parsing the communication data on a second virtual machine, and sending the parsed communication data to a first virtual machine application. According to the present application, on the basis that a connection is established between the second virtual machine and the communication component, a connection between the first virtual machine and the communication component may be also established via the second virtual machine, further the first virtual machine may implement communication directly based on the connection relationship when necessary.

9 Claims, 10 Drawing Sheets

(52) U.S. Cl.
CPC ... *H04W 88/06* (2013.01); *G06F 2009/45579* (2013.01); *G06F 2009/45595* (2013.01)

(56) References Cited

U.S. PATENT DOCUMENTS

| | | |
|---|---|---|
| 9,106,267 B1 * | 8/2015 | Cope .................. H04B 5/00 |
| 2008/0172465 A1 | 7/2008 | Kim |
| 2011/0230231 A1 | 9/2011 | Noda |
| 2012/0252536 A1 | 10/2012 | Noda |
| 2012/0284712 A1 | 11/2012 | Nimmagadda |
| 2013/0086202 A1 | 4/2013 | Connelly |
| 2013/0143544 A1 | 6/2013 | Noda et al. |
| 2013/0275501 A1 * | 10/2013 | Tanimoto ............ H04L 12/4641 |
| | | 709/203 |
| 2013/0288741 A1 | 10/2013 | Sjadieh |
| 2015/0227396 A1 | 8/2015 | Nimmagadda et al. |
| 2016/0004522 A1 | 1/2016 | Connelly |
| 2018/0373518 A1 | 12/2018 | Connelly et al. |

FOREIGN PATENT DOCUMENTS

| | | |
|---|---|---|
| CN | 103959890 A | 7/2014 |
| KR | 20050063304 A | 6/2005 |

OTHER PUBLICATIONS

Written Opinion of the International Search Authority in international application No. PCT/CN2016/077391, dated Oct. 9, 2016.
Supplementary European Search Report in the European application No. 16849932.5 , dated Feb. 27, 2019.

* cited by examiner

COMMUNICATION METHOD AND APPARATUS, AND ELECTRONIC DEVICE AND PROGRAM PRODUCT THEREOF

TECHNICAL FIELD

The present application relates to the technical field of virtualization, and in particular, relates to a communication method and apparatus, and an electronic device and a program product thereof.

BACKGROUND

Virtualization allows a plurality of virtual machines to simultaneously run on one mobile phone, handheld device or computer. By means of the virtualization technology, a user, with no need to use two or more mobile devices, may access a plurality of virtual machines or operating systems on a single physical device. The virtualization technology has great significant characteristic in terms of security. Through isolation achieved by the virtualization technology, a plurality of operating systems are isolated on a single terminal, and thus processes run in the operating systems are prevented from causing adverse impacts to other operating systems.

At present, terminals equipped with multiple virtual machines and multiple operating systems are being drastically developed. However, in the prior art, there is no suitable solution in which virtual machines implement communication via communication components under the architecture of multiple virtual machines. Terminals need to implement voice or data communication via a communication component, whereas corresponding to one communication component, usually only one communication interface layer communication program can be run to implement the communication function, therefore, when a plurality of virtual machines all need to use the same communication component to implement communication, the communication interface layer communication program corresponding to the communication component cannot be run on all virtual machines. If a terminal with a plurality of virtual machines has only one communication component, the corresponding communication interface layer communication program may only be run on one of the virtual machines; and if other virtual machines need to implement communication, a communication interface layer communication program needs to be reestablished on the virtual machines that need to implement communication. As a result, the access is not flexible, and the operation steps are complicated. If a terminal with a plurality of virtual machine has a plurality of communication components, these communication components are generally matched to corresponding virtual machines, the other virtual machines can not flexibly implement the communication function via different communication components.

The prior art is defective mainly in that: there is no suitable solution in which multiple virtual machines in a terminal with a plurality of virtual machines share one or more communication components to implement communication, and these virtual machines cannot simultaneously establish a connection with the communication component, cannot implement the communication function via the communication component timely when necessary.

SUMMARY

Embodiments of the present application provide technical solutions to solve the above technical problem, wherein on the basis that a connection is established between the second virtual machine and a communication component, a connection between the first virtual machine and the communication component may be also established via the second virtual machine, further the first virtual machine may implement communication directly based on the connection relationship when necessary.

In one aspect, embodiments of the present application provide a communication method. The method includes:

acquiring a communication request of a first virtual machine application, packaging the communication request on a second virtual machine, and sending the packaged communication request to a communication component; and/or receiving communication data sent by a communication component, parsing the communication data on a second virtual machine, and sending the parsed communication data to a first virtual machine application.

Preferably, the packaging the communication request on a second virtual machine and sending the packaged communication request to a communication component includes: running a communication interface layer communication program on the second virtual machine to package the communication request, and sending the packaged communication request to the communication component having a first corresponding relationship with the communication interface layer communication program; and/or the parsing the communication data on a second virtual machine includes: running a communication interface layer communication program on the second virtual machine to parse the communication data, wherein the communication component has a first corresponding relationship with the communication interface communication program.

Preferably, prior to the packaging the communication request on a second virtual machine, the method further includes: determining a second relationship between the first virtual machine application and the communication component, and determining, according to the second corresponding relationship and the first corresponding relationship, the communication interface layer communication program corresponding to the first virtual machine application; and/or prior to the sending the parsed communication data to a first virtual machine application, the method further includes: determining a second corresponding relationship between the first virtual machine application and the communication component, and determining, according to the second corresponding relationship and the first corresponding relationship, the first virtual machine application corresponding to the communication interface layer communication program.

Preferably, the determining a second relationship between the first virtual machine application and the communication component includes: determining the second corresponding relationship between the first virtual machine application and the communication component according to a predetermined third corresponding relationship between the first virtual machine and the communication component; or acquiring corresponding relationship selection information, and determining the second corresponding relationship between the first virtual machine application and the communication component according to the corresponding relationship information.

Preferably, the first virtual machine application runs in an Android operating environment, and the communication interface layer communication program is a radio interface layer daemon (RILD).

In another aspect, embodiments of the present application provide a communication apparatus. The apparatus includes:

a proxy module, configured to acquire a communication request of a first virtual machine application; and a communication module, configured to package the communication request on a second virtual machine, and send the packaged communication request to a communication component; and/or a communication module, configured to receive communication data sent by a communication component, and parse the communication data on a second virtual machine; and a proxy module, configured to send the parsed communication data to a first virtual machine application.

Preferably, the communication module is specifically configured to run a communication interface layer communication program on the second virtual machine to package the communication request, and send the packaged communication request to the communication component having a first corresponding relationship with the communication interface layer communication program; and/or the communication module is specifically configured to run a communication interface layer communication program on the second virtual machine to parse the communication data, wherein the communication component has a first corresponding relationship with the communication interface communication program.

Preferably, the apparatus further includes:

a first determining module, configured to determine a second relationship between the first virtual machine application and the communication component, and determine, according to the second corresponding relationship and the first corresponding relationship, the communication interface layer communication program corresponding to the first virtual machine application; and/or a second determining module, configured to determine a second corresponding relationship between the first virtual machine application and the communication component, and determine, according to the second corresponding relationship and the first corresponding relationship, the first virtual machine application corresponding to the communication interface layer communication program.

Preferably, the determining a second relationship between the first virtual machine application and the communication component includes: determining the second corresponding relationship between the first virtual machine application and the communication component according to a predetermined third corresponding relationship between the first virtual machine and the communication component; or acquiring corresponding relationship selection information, and determining the second corresponding relationship between the first virtual machine application and the communication component according to the corresponding relationship information.

acquiring corresponding relationship selection information, and determining the second corresponding relationship between the first virtual machine application and the communication component according to the corresponding relationship information.

Preferably, the first virtual machine application runs in an Android operating environment, and the communication interface layer communication program is a radio interface layer daemon (RILD).

In still another aspect, embodiments of the present application provide an electronic device. The electronic device includes a communication component and the above described communication apparatus.

In still another aspect, embodiments of the present application provide a computer program product used in cooperation with an electronic device including a communication component, wherein the computer program product includes a computer readable storage medium and a computer program mechanism embedded therein, wherein the computer program mechanism includes instructions for performing the following steps:

acquiring a communication request of a first virtual machine application, packaging the communication request on a second virtual machine, and sending the packaged communication request to a communication component; and/or receiving communication data sent by a communication component, parsing the communication data on a second virtual machine, and sending the parsed communication data to a first virtual machine application.

The present application has the following beneficial effects:

In the present application, a communication request of a first virtual machine application is acquired, the communication request is packaged on a second virtual machine, and the packaged communication request is sent to a communication component; and/or communication data sent by a communication component is received, the communication data is parsed on a second virtual machine, and the parsed communication data is sent to a first virtual machine application. According to the present application, on the basis that a connection is established between the second virtual machine and the communication component, a connection between the first virtual machine and the communication component may be also established via the second virtual machine, further the first virtual machine may implement communication directly based on the connection relationship when necessary.

BRIEF DESCRIPTION OF THE DRAWINGS

Specific embodiments of the present application are described hereinafter in detail with reference to the accompanying drawings.

DETAILED DESCRIPTION

Figure 1A:
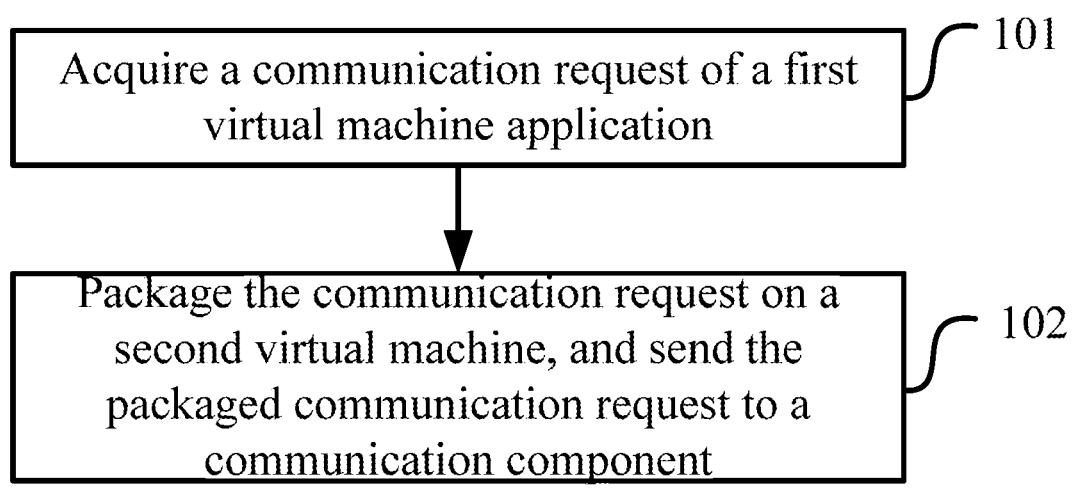
FIG. 1A and FIG. 1B illustrate respectively schematic flowcharts of a communication method according to Embodiment 1 of the present application.

To make the technical solutions and advantages of the present application clearer and more understandable, exemplary embodiments of the present application are described in detail hereinafter with reference to the accompanying drawings. Apparently, the described embodiments are merely a part of embodiments of the present application, instead of all the embodiments of the present application. It should be noted that in cases of no conflict, the embodiments and features in the embodiments of the present application may be combined together.

During practice of the present application, the inventors have identified that the terminal in the prior art is already capable of run a plurality of virtual machines, but there is no suitable solution in which a plurality of virtual machines implement communication via communication components by means of sharing one or a plurality of communication components in a terminal with a plurality of virtual machines, these virtual machines cannot simultaneously establish a connection with the communication component, cannot implement the communication function via the communication component timely when necessary.

With respect to the above defects, the present application proposes a solution, which includes: acquiring a communication request of a first virtual machine application, packaging the communication request on a second virtual machine, and sending the packaged communication request to a communication component; and/or receiving communication data sent by a communication component, parsing the communication data on a second virtual machine, and sending the parsed communication data to a first virtual machine application. According to the present application, on the basis that a connection is established between the second virtual machine and the communication component, a connection between the first virtual machine and the communication module may be also established via the second virtual machine, and further the first virtual machine may implement communication directly based on the connection relationship when necessary.

In the present application, the first virtual machine and the second virtual machine are virtual machines run on the same virtualized layer, wherein on the virtualized layer may further one or more without number-limited other virtual machines are run. The first virtual machine, the second virtual machine and the one or more other without number-limited virtual machines (if any) and the virtualized layer all are run in a single device, or run in a device system formed of a plurality of physical devices, and the virtual machines are implemented by the virtualized layer based on the device hardware. According to the present application, the virtual machine is capable of directly running some applications or running some operating systems and running some applications in the operating system. The operating system run on the virtual machine may be an Android operating system, an iPhone operating system (iOS) or a Microsoft operating system or the like.

The communication component according to the present application, is the hardware having a wireless or wired communication function, may be a modem, a network interface card, a Bluetooth component or the like, and the communication component pertains to the device hardware layer.

For ease of practice of the present application, description is given hereinafter with reference to examples.

Embodiment 1

Figure 1B:
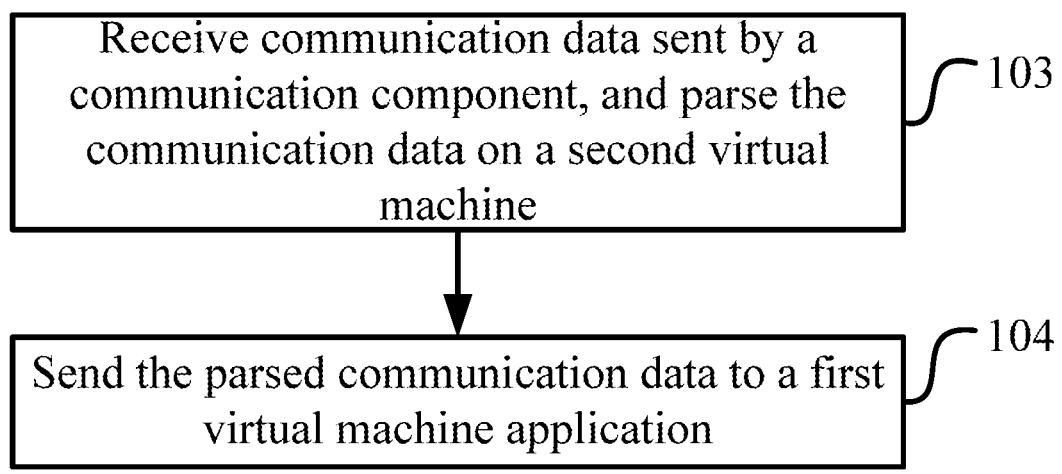

FIGS. 1A and 1B illustrate schematic flowcharts of a communication method according to Embodiment 1 of the present application; wherein FIG. 1A is a forward schematic flowchart of the communication method, and FIG. 1B is a reverse schematic flowchart of the communication method.

As illustrated in FIG. 1A, the forward process of the communication method includes the following steps:

Step 101: A communication request of a first virtual machine application is acquired.

Step 102: The communication request is packaged on a second virtual machine, and the packaged communication request is sent to a communication component.

In step 101, the first virtual machine application is an application run on the first virtual machine, wherein the application may initiate a communication request when necessary. The communication request herein corresponds to the application. For example, when the application is a dial-up program, the communication request may be a voice call initiation request, a hang-up request or an incoming call connection request; and when the application is a browser, the communication request is a request for establishing a network connection or a data request for downloading or sending information and so on. One application may initiate various communication requests, and any instruction that needs to call the communication component may be understood as a communication request.

A data pathway is established between the first virtual machine and the second virtual machine, and a proxy program is run on a communication interface layer of the first virtual machine. The proxy program sends the communication request of the first virtual machine application to the second virtual machine via the data pathway. The data pathway may be practiced based on a virtualized layer or based on other medium, which is not limited herein.

In step 102, upon acquiring the communication request of the first virtual machine application, the second virtual machine packages the communication request into a data packet in a format that may be identified and received by the communication component, and sends the data packet to the communication component.

On the basis of the second virtual machine and the communication component having connection relationship, the application run on the second virtual machine may directly establish a connection with the communication component via a communication interface layer of the second virtual machine. That is, the communication request initiated by the application run on the second virtual machine is packaged into a data packet in a format that may be identified and received by the communication component, and then sent to the communication component. In this embodiment, the first virtual machine forwards all the communication requests of the application run on the first virtual machine to the second virtual machine, and establishes a connection with the communication component via the second virtual machine, such that the first virtual machine may also implement communication based on the connection relationship when necessary.

Preferably, the communication request is packaged on a second virtual machine, and the packaged communication request is sent to a communication component includes: the communication request is packaged on the second virtual machine run a communication interface layer communication program, and the packaged communication request is sent to the communication component having a first corresponding relationship with the communication interface layer communication program.

The connection between the communication interface layer of the second virtual machine and the communication component is established by running a communication interface layer communication program on a communication interface layer, wherein the communication interface layer communication program matches the communication component and has a first corresponding relationship with the communication component.

The term "match" signifies that when the communication component is a model, a network interface card, a Bluetooth or the like wired or wireless communication component, and/or when the virtual machine runs an operating system such as Android, iOS or Microsoft or the like, a matched communication interface layer communication program is available, which is capable of packaging communication requests of applications run in various environments into data packets that may be received and identified by the communication component for implementation of communication.

The expression "a first corresponding relationship" signifies that there is a corresponding relationship between the communication component and the communication interface layer program on the second virtual machine. The corresponding relationship may be defined when the virtual machine is created, or may be defined by the user under the circumstance where there is a virtual machine.

Figure 2A:
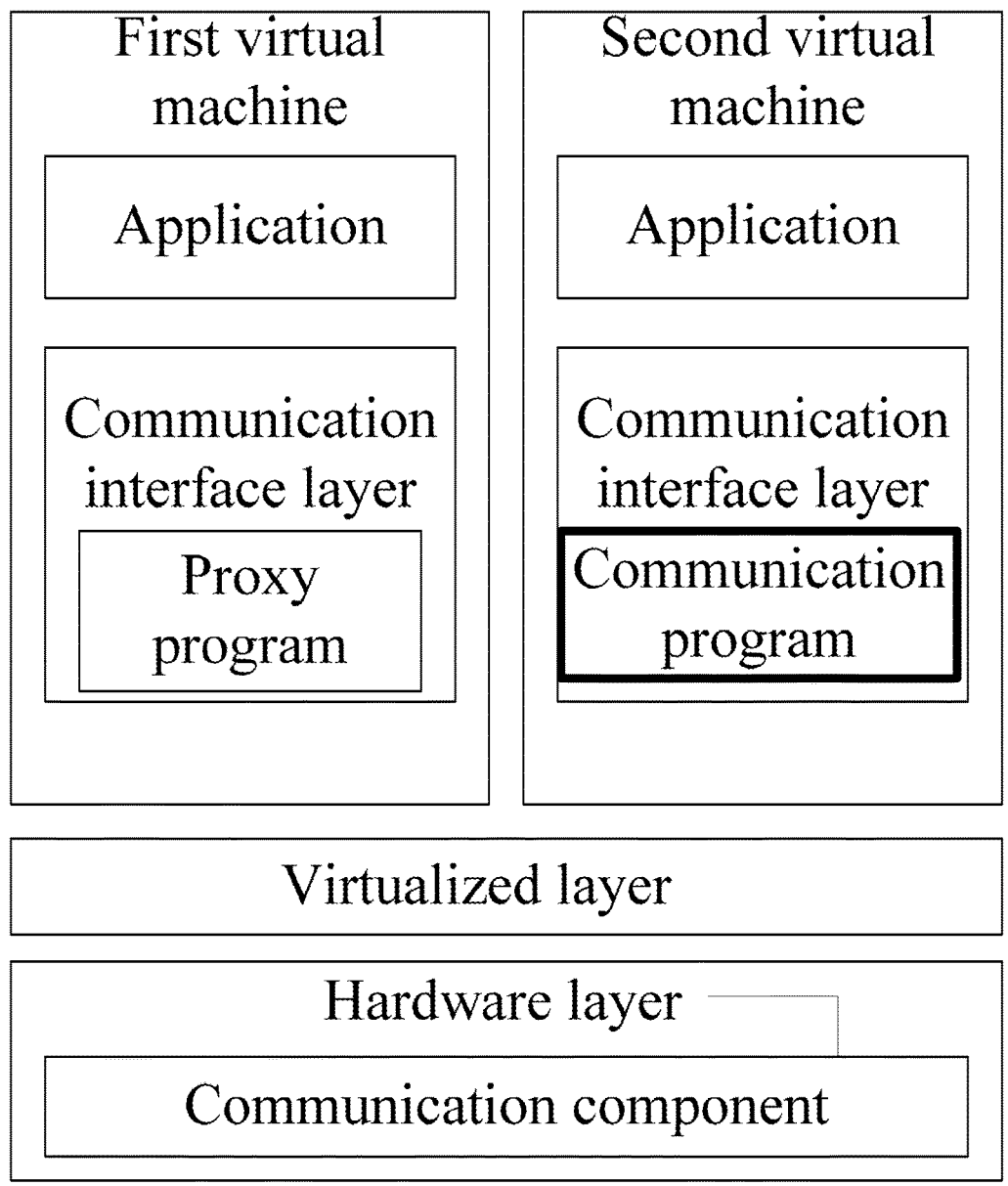
FIG. 2A, FIG. 2B, FIG. 2C, and FIG. 2D illustrate respectively schematic diagrams of virtualized system architecture according to some embodiments of the present application.
Figure 2B:
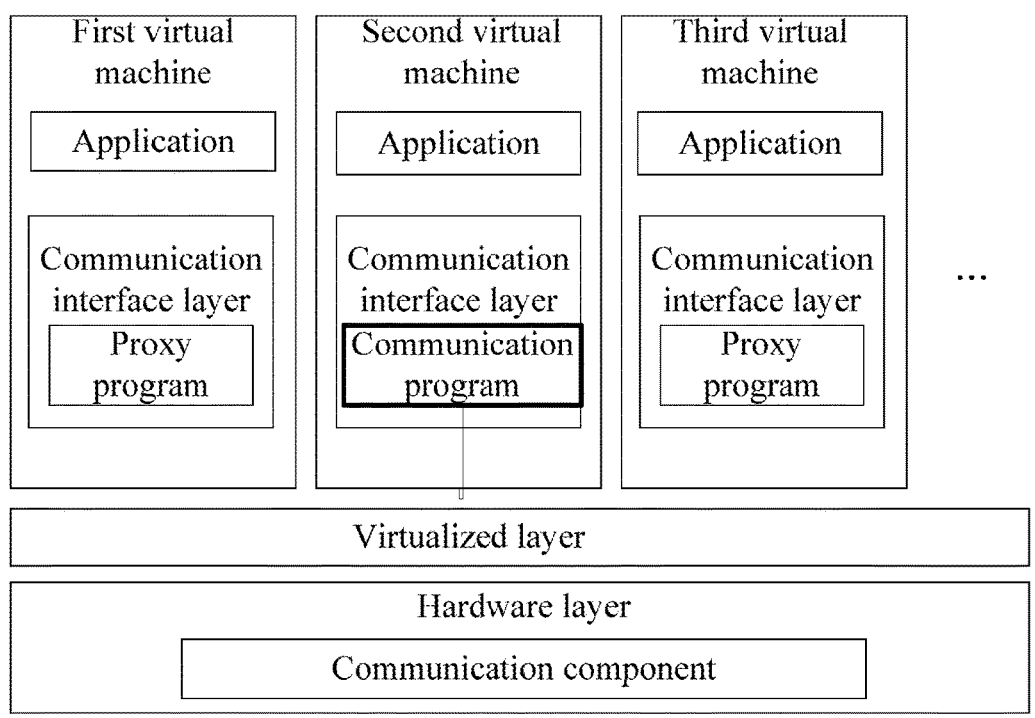

In the present embodiment, if the virtualized system architecture has only one communication component, as illustrated in FIG. 2A, and the communication interface layer communication program having a first corresponding relationship with the communication component runs on the second virtual machine, it indicates that the only one communication component only establishes a connection with the second virtual machine and implements communication. This is because the application on the second virtual machine is capable of normally connecting to this only one communication interface to implement communication only when the communication interface layer communication program having the first corresponding relationship with the communication component is run on the second virtual machine. If the application on the first virtual machine desires to implement communication via the only one communication component, communication may be only implemented by using the communication interface layer communication program run on the second virtual machine and having the first corresponding relationship with the communication component. In addition, if the virtualized system architecture in the present embodiment further includes one or more other virtual machines in addition to the first virtual machine and the second virtual machine, as illustrated in FIG. 2B, when the applications run on these virtual machines desire to implement communication via the only one communication component, the communication also needs to be implemented via the second virtual machine. The application on the second virtual machine may directly connect with the communication component via the communication program run on the second virtual machine to implement communication; whereas each of the virtual machines except the second virtual machine need to run a proxy program, and forwards the communication request of the application thereon to the second virtual machine to implement communication.

Figure 2C:
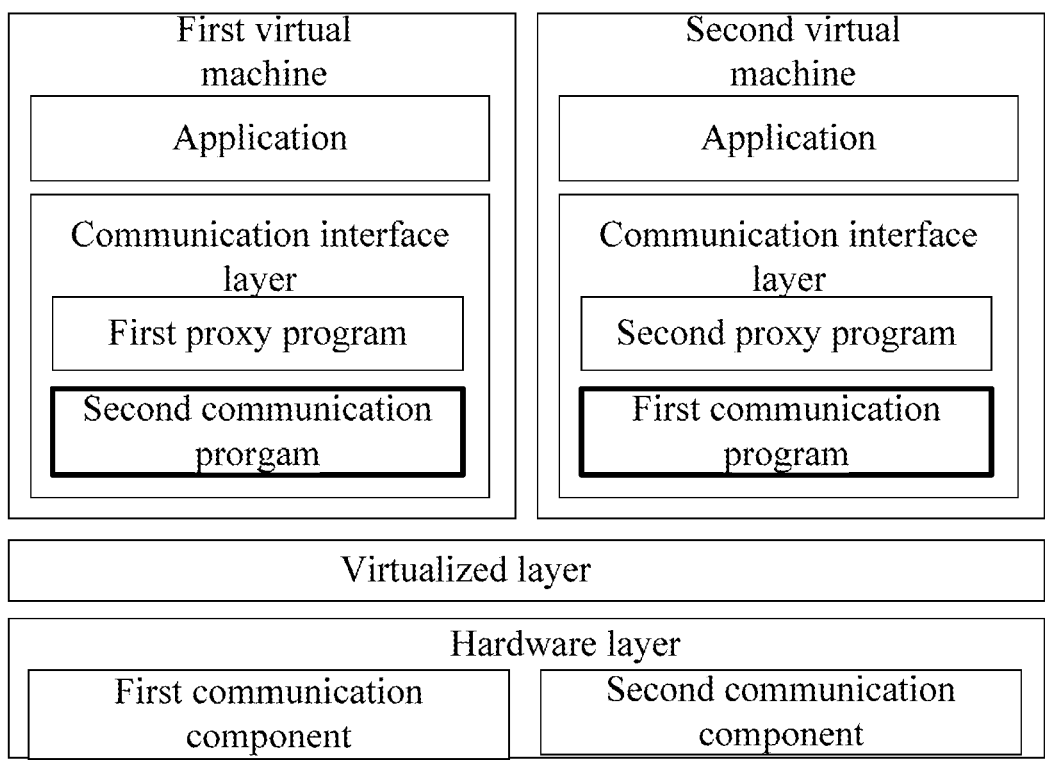

In the present embodiment, if there are two communication components or more, each communication component has only one virtual machine in a corresponding relationship with the communication component and a communication interface layer communication program run on the virtual machine and matches the communication component. For example, in a scenario where the virtualized system architecture has two virtual machines, a first virtual machine and a second virtual machines, and has two communication components, a first communication component and a second communication component, as illustrated in FIG. 2C. The first communication component is in the first corresponding relationship with a first communication program run on the communication interface layer of the second virtual machine, that is, the first communication component only establishes a connection with the second virtual machine to implement communication, and the application on the second virtual machine may directly connects with the communication component via the first communication program run on the second virtual machine to implement communication. When the application run on the first virtual machine needs to call the first communication component, the first communication component cannot be directly called, all the communication request need to be forwarded to the second virtual machine based on a first proxy program run on the communication interface layer corresponding to the first communication program, and it is implemented that the first communication component is called by the application run on the first virtual machine through the connection established between the first communication program run on the second virtual machine and the first communication component. Similarly, the second communication component is also in a corresponding relationship with the second communication program run on the communication interface layer of the first virtual machine, that is, the second communication component only establishes a connection with the first virtual machine to implement communication, and the application of the first virtual machine may directly connect with the communication component via the second communication program run on the first virtual machine to implement communication. When the application run on the second virtual machine needs to call the first communication component, the first communication component cannot be directly called, and all the communication request need to be forwarded to the first virtual machine based on a second proxy program run on the communication interface layer and corresponding to the second communication program, and it's implemented that the second communication component is called by the application run on the second virtual machine through a connection established between the second communication program run on the first virtual machine and the second communication component.

Figure 2D:
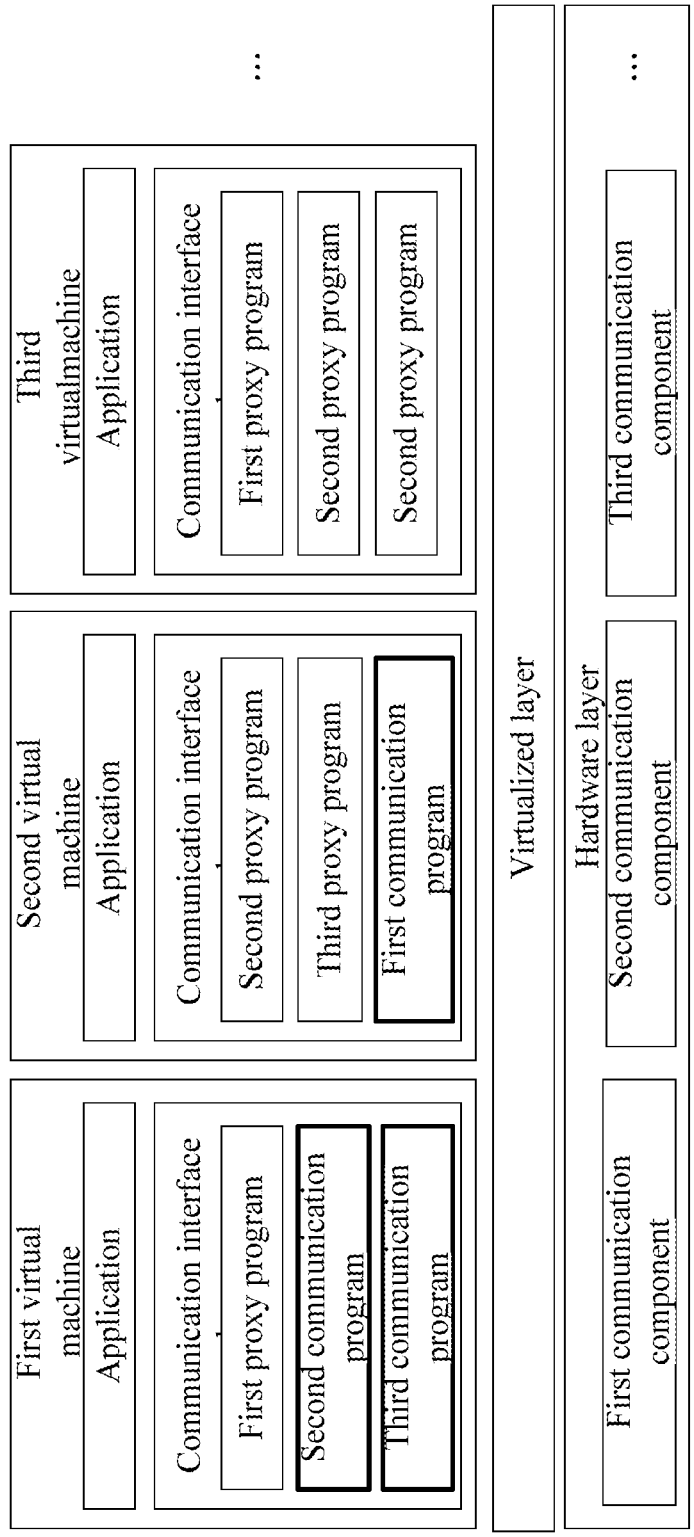

Still for example, in a scenario where the virtualized system architecture has more than two virtual machines and has more than two communication components, these communication programs having the first corresponding relationship with these communication components may be run on one single virtual machine, or may respectively be run on different virtual machines. These virtual machines may run one or more communication programs, or may run no communication program. When a virtual machine runs a communication program corresponding to a communication component, the application on the virtual machine may directly establish a connection with the communication component via the communication program to implement communication. When a virtual machine does not run a communication program corresponding to a communication component, a proxy program related to the communication program corresponding to the communication component needs to be run, and the proxy program forwards the communication request to the virtual machine running the communication program, and then a connection is established. As illustrated in FIG. 2D, an exemplary scenario in the above case is given. A first virtual machine runs a second communication program corresponding to a second communication program, and a third communication component corresponds to a third communication program; and the second virtual machine runs a first communication program corresponding to the first communication component. When the applications run on these virtual machines need to implement communication via the second or third communication component, only the application run on the first virtual machine is capable of directly establishing a connection with the communication component; and apart from the first virtual machine, the applications on other virtual machines all need a second or third proxy program run on their respective virtual machines to forward the communication request to the first virtual machine and then establish a connection with the second or third communication component to implement communication. When the applications run on these virtual machines need to implement communication via the first communication component, only the application run on the second virtual machine is capable of directly establishing a connection with the communication component; and apart from the second virtual machine, the applications on the other virtual machines all need a first proxy program run on their respective virtual machines to forward the communication request to the second virtual machine and then establish a connection with the first communication component to implement communication.

As illustrated in FIG. 1B, the inverse process of the communication method according to Embodiment 1 includes the following steps:

Step 103: Communication data sent by a communication component is received, and the communication data is parsed on a second virtual machine.

Step 104: The parsed communication data is sent to a first virtual machine application.

Steps 103 and 104 correspond to steps 101 and 102 above, and describe an inverse communication process, wherein the similar or duplicate portions may be referenced to steps 101 and 102.

In step 103, the second virtual machine parses the communication data sent by the communication component, which means, namely parses the communication data into data in a format that may be identified and received by a virtual machine environment. A data pathway is established between the first virtual machine and the second virtual machine, the second virtual machine sends the parsed communication data to the first virtual machine via the data pathway. The data pathway may be practiced based on a virtualized layer or based on other medium, which is not limited herein.

In step 104, the first virtual machine receives the parsed communication data, and sends the parsed communication data to an application run on the first virtual machine. The first virtual machine needs to judge the application corresponding to the communication data according to the content of the parsed communication data, if the application has been started, send the communication data directly; and if the application has not been started, start the related application and then send the communication data. Herein the parsed communication data corresponding to the application may be any data that may be fed back by the communication component to the application, and one application may acquire various parsed communication data. For example, when the application is a dial-up program, the parsed communication data may be a voice signal, or may be an incoming call notification or a hang-up signal of a receiving party of the call; and when the application is a browser, the parsed communication data may be a signal feedback indicative of successful connection establishment, or data content and the like received and downloaded by the browser.

A proxy program is run on the communication interface layer of the first virtual machine; and the proxy program receives the parsed data sent by the second virtual machine via the data pathway, and sends the parsed communication data to the corresponding application.

On the basis of the second virtual machine and the communication component having connection relationship, the application run on the second virtual machine may directly establish a connection with the communication component via a communication interface layer of the second virtual machine. That is, the second virtual machine is capable of received the communication data sent by the communication component, parsing the communication data into a data packet in a format that may be identified and received by the application on the virtual machine and sending the data packet to the application run on the second virtual machine. In this embodiment, the second virtual machine is connected to the communication component, receives the communication data sent by the communication component, parses the communication data and sends the parsed communication data to the first virtual machine; the first virtual machine sends the parsed communication data to the application run on the first virtual machine. In this way, the first virtual machine application is connected to the communication component via the second virtual machine, such that the first virtual machine may also directly implement communication based on the above connection when necessary.

Preferably, the second virtual machine parses the communication data sent by the communication component includes: the communication data is parsed on the second virtual machine running a communication interface layer communication program, wherein the communication component has a first corresponding relationship with the communication interface communication program.

The connection between the communication interface layer of the second virtual machine and the communication component is established by running a communication interface layer communication program on a communication interface layer, wherein the communication interface layer communication program matches with the communication component and has a first corresponding relationship with the communication component.

The term "match" and the expression "a first corresponding relationship" signifie the same as that in the forward process of the above described communication method. Merely, herein the communication process is reverse. That is, the communication component sends the communication data to a communication program run on the communication interface layer of a virtual machine matching and having a corresponding relationship with the communication component, and then the data is forwarded by the communication program. The virtual machine that does not run a corresponding communication program needs to run a proxy program corresponding to the above communication program to acquire the data forwarded by the communication program, and then forward the data to the application run on the virtual machine. The reverse process also applies to the example of the virtualized system architecture as illustrated in FIGS. 2A to 2D and description of the corresponding relationship.

The forward and inverse communication processes in this embodiment may be both independently implemented. In addition, since the communication process may involve multiple data interactions, the forward and inverse communication processes may coexist.

Embodiment 2

Figure 3A:
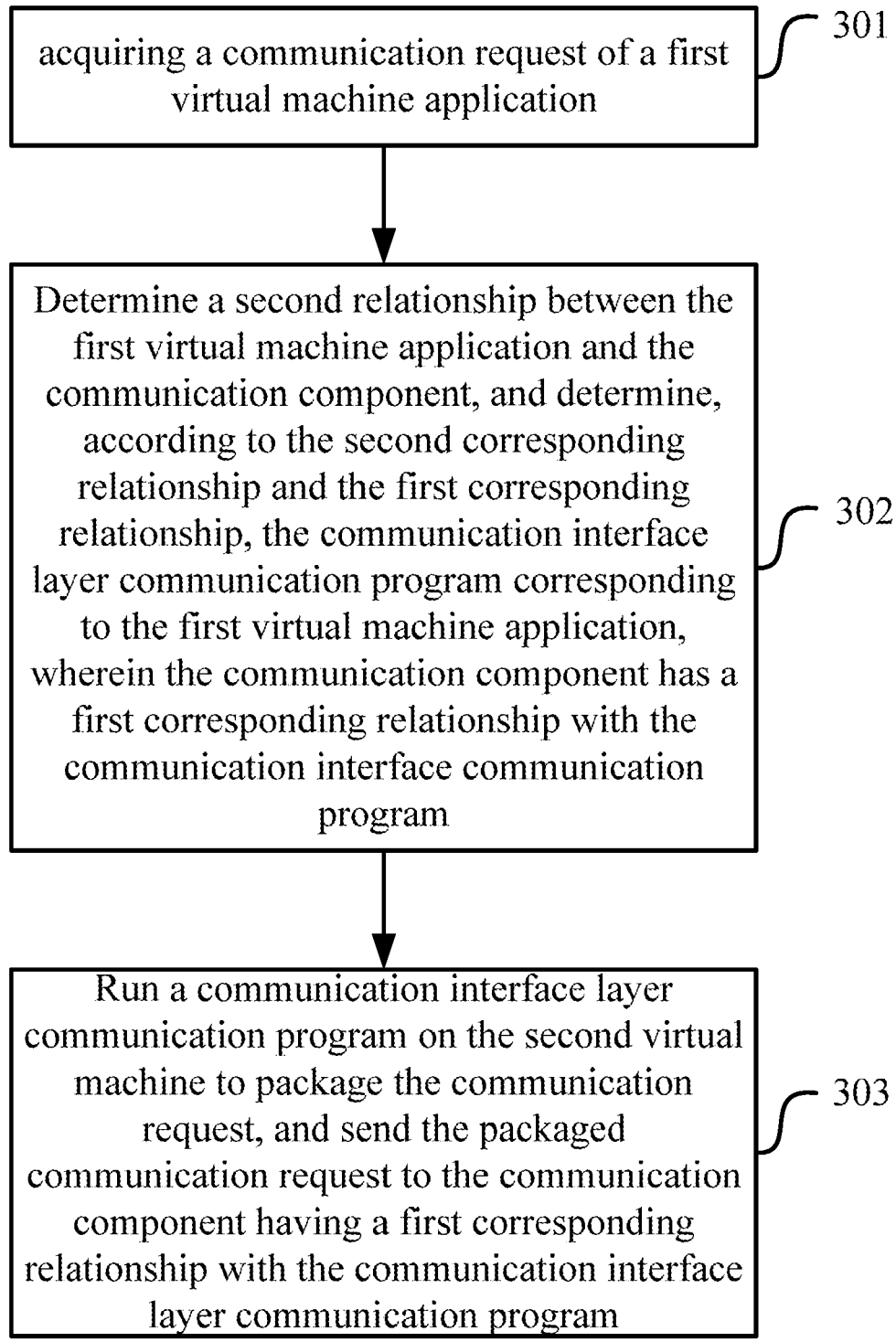
FIG. 3A and FIG. 3B illustrate schematic flowcharts of a communication method according to Embodiment 2 of the present application.
Figure 3B:
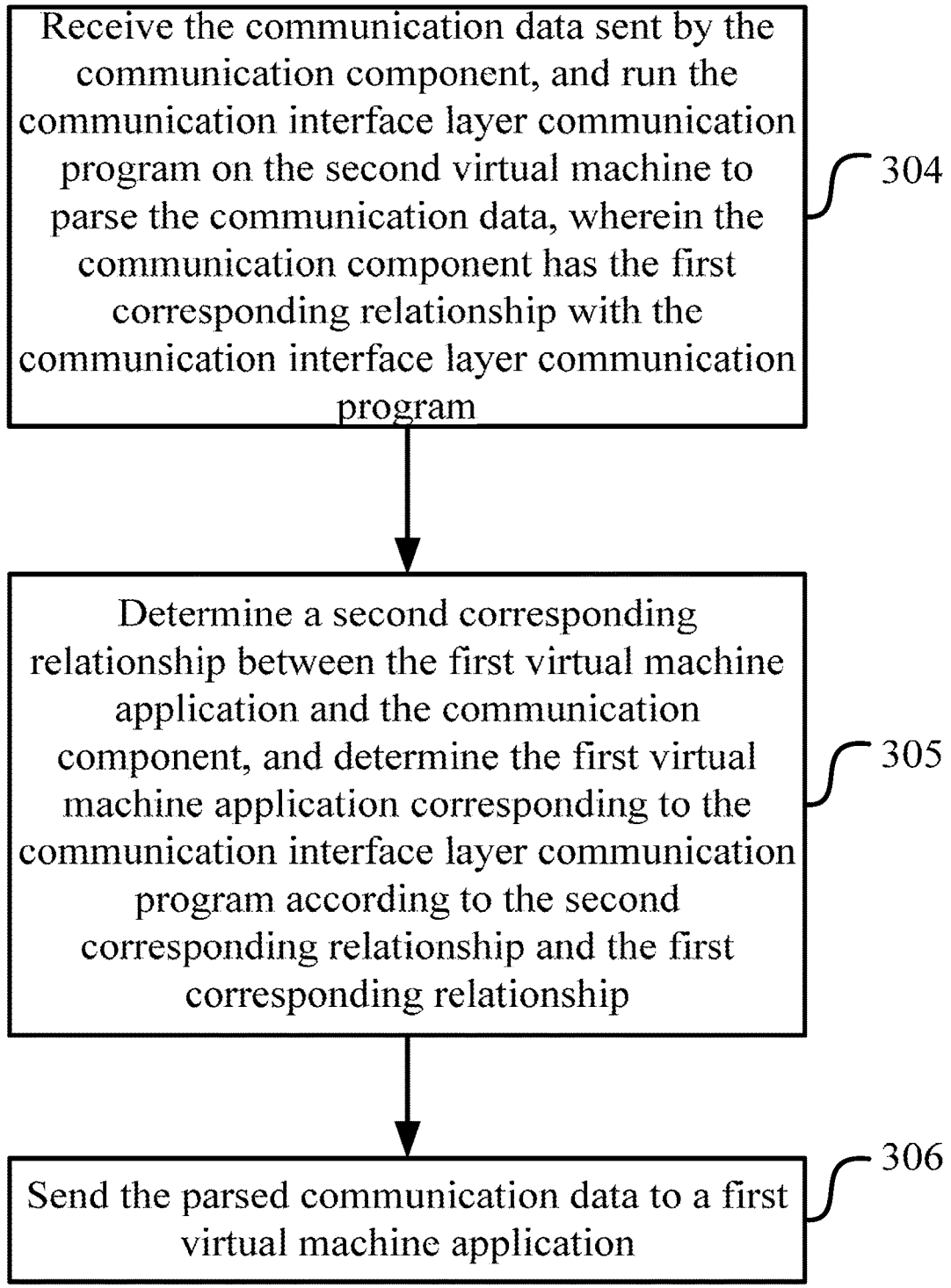

FIGS. 3A and 3B illustrate schematic flowcharts of a communication method according to Embodiment 2 of the present application; wherein FIG. 3A is a forward schematic flowchart of the communication method, and FIG. 3B is a reverse schematic flowchart of the communication method. The portions of Embodiment 2 that are similar or duplicate to those of Embodiment 1 may be referenced to the description in Embodiment 1.

As illustrated in FIG. 3A, the forward process of the communication method includes the following steps:

Step 301: A communication request of a first virtual machine application is acquired.

Step 302: A second corresponding relationship between the first virtual machine application and a communication component is established, a communication interface layer communication program corresponding to the first virtual machine application is determined according to the second corresponding relationship and the first corresponding relationship, wherein the communication interface layer communication program has the first corresponding relationship with the communication component.

Step 303: A communication interface layer communication program is run on the second virtual machine to package the communication request, and the packaged communication request is sent to the communication component having a first corresponding relationship with the communication interface layer communication program.

Step 301 is the same as step 101. Merely, before the communication request is sent to the second virtual machine via the data pathway, the method further includes step 302.

When the virtualized system includes two or more than two virtual machines, and includes two or more than two communication components, after the application request of the first virtual machine is acquired, it may be acquired in step 302 which communication component the application request is directed to, so as to complete the subsequent communication process. The first corresponding relationship in step 302 has the same meaning as the first corresponding relationship in Embodiment 1, and the details may be referenced to the above description.

Using the architecture as illustrated in FIG. 2C as an example, if it is judged that the communication request of the first virtual machine application needs to be implemented by the second communication component, the first virtual machine application may directly implement communication via the second communication component since the second communication program run on the first virtual machine has the first corresponding relationship with the second communication component and is capable of directly connecting to the second communication component. If it is judged that the first virtual machine application has a second corresponding relationship with the first communication component, that is, the application request of the first virtual machine is directed to the first communication component, the first communication component needs to implement communication for the first virtual machine application. In addition, the first communication component has the first corresponding relationship with the first communication program in the communication interface layer of the second virtual machine. In this case, it may be acquired, according to the second corresponding relationship and the first corresponding relationship, that the communication request of the first virtual machine application should be sent to the second virtual machine, and the first communication program run on the communication interface layer of the second virtual machine continues the subsequent communication process. Therefore, the first proxy program run on the first virtual machine needs to send the acquired communication request of the first virtual machine application to the first communication program corresponding to the first proxy program via the data pathway between the first virtual machine and the second virtual machine.

Similarly, using the architecture as illustrated in FIG. 2D as an example, if it is judged that the communication request of the second virtual machine application needs to be implemented by the first communication component, a connection is established directly. If it is judged that the second virtual machine application has a second corresponding relationship with the second communication component, that is, the application request of the second virtual machine is directed to the second communication component, the second proxy program run on the second virtual machine sends the communication request to the second communication program on the communication interface layer of the first virtual machine via a data pathway, to implement the subsequent communication process. If it is judged that the second virtual machine application has a second corresponding relationship with the third communication component, that is, the application request of the second virtual machine is directed to the third communication component, the third proxy program run on the third virtual machine sends the communication request to the second communication program on the communication interface layer of the first virtual machine via a data pathway, to implement the subsequent communication process.

Preferably, the second corresponding relationship between the first virtual machine application and the communication component is determined according to a predetermined third corresponding relationship between the first virtual machine and the communication component; or corresponding relationship selection information is acquired, and the second corresponding relationship between the first virtual machine application and the communication component is determined according to the corresponding relationship selection information.

In step 302, the second corresponding relationship is determined. That is, which communication component the application run on a virtual machine is directed to may be determined in one of the following two manners:

Manner 1: The determination is made according to a predetermined corresponding relationship between virtual machines and communication components. That is, a corresponding relationship between a virtual machine and a communication component is defined when building the virtualized system architecture, establishing a virtual machine or, defined or redefined in the existent virtualized system architecture. The defining of the corresponding relationship indicates that the communication request of any application run on a virtual machine may be directed to a communication component. That is, a fixed communication component implements communication for a specific virtual machine. When the communication components defined for these virtual machines are different, communication of the applications of these virtual machines may be implemented by different communication components, such that the communication data is effectively isolated.

Manner 2: The determination is made according to corresponding relationship selection information. In the forward process, the corresponding relationship selection information may be information indicative of the communication component selected by a user for implementing communication acquired when the communication request of the application is acquired. For example, when the first communication component is a WiFi communication component and the second communication component is a 3G communication component, when opening a network browser application in the first virtual machine environment, the user may select a data connection manner when starts web browser, that is, selecting a specific communication component to implement communication of the application. Based on the corresponding habitual selection information of a user with respect to a first virtual machine application, a second corresponding relationship between the first virtual machine application and the selected communication component may be established. In this manner, different applications run on one single virtual machine may implement communication by using different communication components.

Step 303 is similar to step 102, and the duplicate portions may be referenced to step 102. In step 303, the communication program run on the communication interface layer of the corresponding virtual machine receives, via the data pathway, the communication request sent in step 303, packages the communication request and sends the packaged communication request to the corresponding communication component to implement communication.

As illustrated in FIG. 3B, the inverse process of the communication method according to Embodiment 2 includes the following steps:

Step 304: The communication data sent by the communication component is received, and run the communication interface layer communication program on the second virtual machine to parse the communication data, wherein the communication component has the first corresponding relationship with the communication interface layer communication program.

Step 305: A second corresponding relationship between the first virtual machine application and the communication component is determined, and the first virtual machine application corresponding to the communication interface layer communication program is determined according to the second corresponding relationship and the first corresponding relationship.

Step 306: The parsed communication data is sent to a first virtual machine application.

Steps 304 to 306 correspond to steps 301 to 303, and describe an inverse communication process, wherein the similar or duplicated portions may be referenced to steps 301 to 303.

Step 304 is the same as step 103. Before the second virtual machine sends the parsed communication data to the first virtual machine via the data pathway, the method further includes step 305.

When the virtualized system includes two or more than two virtual machines, and includes one or more communication components, after the communication data sent by a communication component is acquired, it may be further acquired in step 305 which virtual machine runs an application the communication data is directed to, so as to complete the subsequent communication process. The first corresponding relationship in step 305 has the same meaning as the first corresponding relationship in Embodiment 1, and the details may be referenced to the above description.

Using the architecture as illustrated in FIG. 2A or FIG. 2C as an example, after the second virtual machine receives the communication data sent by the first communication component and parses the communication data, if it is judged that the data is directed to the application run on the second virtual machine, the parsed data does not need to be sent to the other virtual machines, but is directly sent to the application run on the second virtual machine. If it is judged that the first communication data has a second corresponding relationship with a first virtual machine application, that is, the communication data fed back by the first communication component is directed to the application run on the first virtual machine, it may be acquired, according to the second corresponding relationship and the first corresponding relationship, that the first communication program run on the communication interface layer of the second virtual machine should send the parsed communication data to the first virtual machine via the data pathway between the first virtual machine and the second virtual machine, such that the subsequent communication process is implemented on the first virtual machine.

Similarly, using the architecture as illustrated in FIG. 2B or FIG. 2D as an example, after the second virtual machine receives the communication data sent by the first communication component and parses the communication data, if it is judged that the data is directed to the application run on the second virtual machine, the parsed data is directly sent to the application run on the second virtual machine. If it is judged that the first communication data has a second corresponding relationship with a first virtual machine application, that is, the communication data fed back by the first communication component is directed to the application run on the first virtual machine, it may be acquired that the first communication program run on the communication interface layer of the second virtual machine should send the parsed communication data to the first virtual machine via a data pathway between the first virtual machine and the second virtual machine, such that the subsequent communication process is implemented on the first virtual machine. Similarly, if it is judged that the first communication component has a second corresponding relationship with a third virtual machine application, the first communication program sends the parsed communication data to a third virtual machine via a data pathway between the second virtual machine and the third virtual machine, such that the subsequent communication process is implemented on the third virtual machine.

Preferably, the second corresponding relationship between the first virtual machine application and the communication component is determined according to a predetermined third corresponding relationship between the first virtual machine and the communication component; or corresponding relationship selection information is acquired, and the second corresponding relationship between the first virtual machine application and the communication component is determined according to the corresponding relationship selection information.

In step 305, the second corresponding relationship is determined. That is, which virtual machine runs an application the communication data is directed to may be determined in one of the following two manners:

Manner 1: The determination is made according to a predetermined corresponding relationship between virtual machines and communication components. That is, a corresponding relationship between a virtual machine and a communication component is defined when building the virtualized system architecture, establishing a virtual machine or in the existent virtualized system architecture, or redefined. The defining of the corresponding relationship indicates that the communication data acquired by a communication component is directed to a virtual machine. When the virtual machines defined for various communication components are different, a communication component is dedicated to processing communication data of a virtual machine, instead of processing data of other virtual machines, thereby effectively isolating the communication data.

Manner 2: The determination is made according to corresponding relationship selection information. In the reverse process, the corresponding relationship selection information may be information indicative of user's selection of the virtual machine application acquired after the communication request is parsed. For example, when the first communication component is a voice call component, upon receiving an incoming call, the first communication component sends the communication data to the first communication program run on the communication interface layer of the second virtual machine; and after the data request is parsed, a prompt message is displayed in the second virtual machine, which prompts a user which virtual machine should be selected for processing the incoming call. If the user selects the first virtual machine, a second corresponding relationship between a voice call application run on the first virtual machine and the first communication component is established. In the reverse process, the corresponding relationship selection information may also be information of user's selection of a communication component for implementing communication acquired when a user initiates a communication request. In this case, in the subsequent forward and reverse communication processes upon the application, the application still maintains a third corresponding relationship with the first communication component. For example, the user opens a browser application on the first virtual machine and selects the first communication component to implement communication, subsequently upon receiving the data related to the browser application sent by the first communication component, the second virtual machine is still capable of feeding back the network data to the browser application on the first virtual machine according to the corresponding relationship between the first virtual machine browser application and the first communication component. In this manner, the communication data of the application acquired by the same communication component may be selectively sent to different virtual machines, such that the applications run on the different virtual machines process the communication data, which is more flexible in practice.

The forward and inverse communication processes in this embodiment may be both independently implemented. In addition, since the communication process may involve multiple data interactions, the forward and inverse communication processes may coexist.

Embodiment 3

Figure 4:
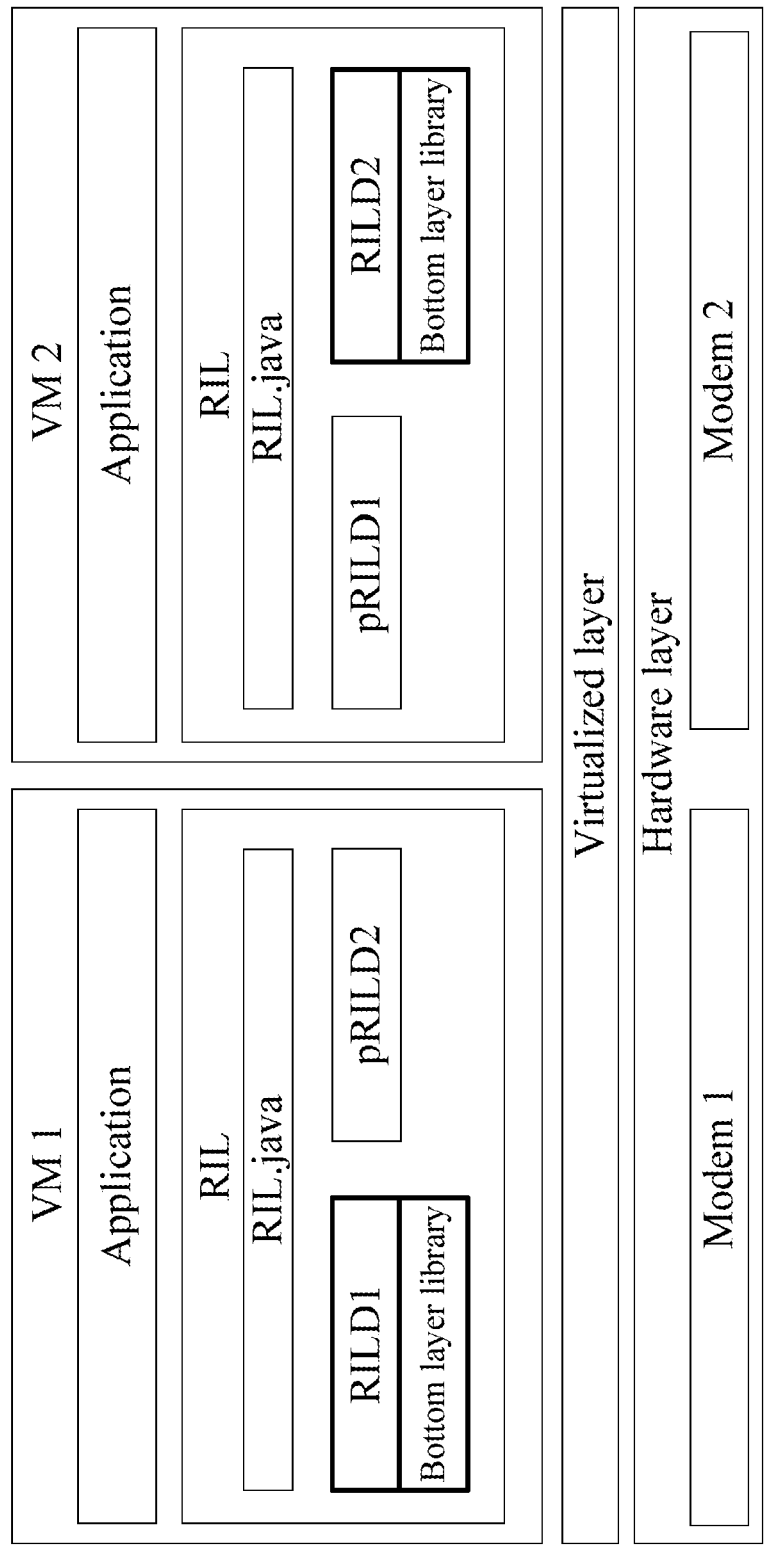
FIG. 4 illustrates a schematic diagram of virtualized system architecture according to Embodiment 3 of the present application.

This embodiment describes Embodiment 1 of the present application in detail by using a radio interface layer daemon run in an Android operating environment as the communication interface layer communication program. FIG. 4 illustrates a schematic diagram of virtualized system architecture according to Embodiment 3 of the present application.

A mobile terminal has two models, model 1 and modem 2, and generally each model corresponds to a SIM card (in this embodiment, modem 1 accesses SIM card 1 and modem 2 accesses SIM card 2). The mobile terminal has two virtual machines, virtual machines VM 1 and VM 2, which respectively bear its operating system and related applications for the convenience of isolation operation of a user.

A radio interface layer daemon (RILD 1) and a proxy radio interface layer daemon (pRILD 2) is run in radio interface layer (RIL) of the virtual machine VM 1, and a pRILD 1 and an RILD 2 are run in the virtual machine. The virtualized layer Hypervisor may coordinate to assign an RILD to corresponding hardware resource of a modem, for example, in this embodiment, building a corresponding relationship between RILD 1 and modem 1, and building a corresponding relationship between RILD 2 and modem 2. That is, RILD 1 is responsible for information and control of communication via modem 1, and RILD 1 may implement interconnection between the application on VM 1 and RIL.java and modem 1 by calling a bottom layer library; RILD 2 is responsible for information and control of communication via modem 2, and RILD 2 may implement interconnection between the application on VM 2 and RIL.java and modem 2 by calling a bottom layer library.

pRILD 1 in VM 2 is an RILD 1 front end proxy program, and does not directly call the bottom layer library (the bottom layer library includes RIL.so, QMI, dynamic link library libril.so, ril implementation library libreference-ril.so and the like), wherein the bottom layer library is only called by RILD 1 in VM 1. pRILD 1 in VM 2 may be synchronous in real time with RILD 1, and implements interconnection between the application on VM 2 and RIL.java and modem 1 by calling the related bottom layer library in VM 1. Similarly, pRILD 2 in VM 1 may be synchronous in real time with RILD 2 in VM 2, and implements interconnection between the application on VM 1 and RIL.java and modem 2 by calling the related bottom layer library in VM 2.

Data is transmitted between VM 1 and VM 2 via a data pathway established by the virtualized layer. The data pathway is responsible for synchronizing in real time the data of RILD 1 in VM 1 to pRILD 1 in VM 2, and meanwhile synchronizing an operation performed by a VM 2 upper layer mobile terminal application on modem 1 acquired by pRILD 1 to RILD 1 in VM 1. The corresponding data pathway is also responsible for synchronizing in real time the data of RILD 2 in VM 2 to pRILD 2 in VM 1, and meanwhile synchronizing an operation performed by a VM 1 upper layer mobile terminal application on modem 2 acquired by pRILD 2 to RILD 2 in VM 2. The data pathway between the virtual machines is implemented based on the prior art, which is not limited herein.

Under the above architecture, a voice call is implemented as follows:

A user may make a call by using modem 1 (SIM card 1) in an operating environment of VM 1. Specifically, the user triggers an upper layer dialup application, and selects SIM card 1 to make the call; RIL.java sends the application request to RILD 1 via a socket; RILD 1 loads a bottom layer library and packages the same into an AT command and sends the same to modem 1; meanwhile, RILD 1 parses the request sent by modem 1, and then sends the request to RIL.java via socket such that RIL.java returns the request to the upper layer application. Similarly, a user may make a call by using modem 2 (SIM card 2) in an operating environment of VM 2. Specifically, the user triggers an upper layer dialup application, and selects SIM card 2 to make the call; RIL.java sends the application request to RILD 2 via socket; RILD 2 loads a bottom layer library and packages the same into an AT command and sends the same to modem 2; meanwhile, RILD 2 parses the request sent by modem 2, and then sends the request to RIL.java layer via socket such that RIL.java layer returns the request to the upper layer application.

When a user desires to make a call by using modem 2 (SIM card 2) in an operating system of VM 1, the user triggers an upper layer dialup application, and selects SIM card 2 to make the call; RIL.java layer sends an application request to pRILD 2 via socket; pRILD 2 sends in real time the request of the user to RILD 2 via a data pathway between the virtual machines, such that RILD 2 in VM 2 loads a bottom layer library, packages the request into an AT command and sends the same to modem 2; meanwhile, RILD 2 parses the request sent by modem 2, and sends the parsed request to pRILD 2 of the virtual machine via the data pathway between the virtual machines; pRILD 2 sends the request to RIL.java of VM 1 via socket such that RIL.java layer returns the request to the upper layer application. When the user desires to make a call by using modem 1 (SIM card 1) in an operating system of VM 2, the process is similar.

When a call is incoming, for example, SIM card 1 (modem 1) has an incoming call indication, the user may select a virtual machine environment in which to answer the call. If the user selects to answer the call in VM 1, RILD 1 directly processes the incoming call request in VM 1. If the user selects to answer the call in VM 2, reference may be made to the above process, RILD 1 forwards the incoming call data to pRILD 1, such that VM 2 processes the incoming call.

In a scenario of answering a call, when a user answers a call of SIM card 1 (modem 1), one virtual machine processes the call. In this case, if phone number 2 (SIM card 2 or modem 2) of the user is also called, another virtual machine may process the call, such that the user is capable of acquiring information of the call and determining whether to answer the call, thereby dual-card dual-standby is implemented. Similarly, when the user makes a call by using SIM card 1 (modem 1) via a virtual machine, if SIM card 2 (modem 2) of the user is also being called, another virtual machine may process the call, such that the user is capable of acquiring information of the call and determining whether to answer the call, thereby dual-card dual-standby is implemented.

Under the above architecture, data communication is implemented as follows:

In an operating environment of VM 1, a user may establish a data connection via modem 1 (SIM card 1). Specifically, the user triggers an upper layer browser application; according to a defined or selected and data connection manner using SIM card 1, RIL.java sends an application request to the RILD 1 via socket; RILD 1 establishes connection 1 via which data is received or sent by using modem 1, and subsequently various applications on VM 1 may implement data connection by using modem 1 (SIM card 1) via connection 1. In an operating environment of VM 2, the user may establish a data connection by using modem 2 (SIM card 2), and the process is similar.

When a user desires to establish a data connection by using modem 2 (SIM card 2) in an operating environment of VM 1, the user triggers an upper layer browser application, and selects a data connection manner using SIM card 2; RIL.java sends an application request to pRILD 2 via socket; pRILD 2 sends in real time the request of the user to RILD 2 in VM 2 via a data pathway between virtual machines, such that RILD 2 in VM 2 loads a bottom layer library to establish connection 2 via which data is received and sent by using modem 2. Subsequently, various applications on VM 1 may implement data connection by using modem 2 (SIM card 2) via connection 2. When the user desires to establish a data connection by using modem 1 (SIM card 1) in an operating system of VM 2, the process is similar.

By using a smart phone as an example, this embodiment describes a method for calling two modems by the applications on these two virtual machines when the mobile phone runs two virtual machines equipped with an Android operating system. It may be understood that in other embodiments, the virtual machine may be equipped with other operating systems, the application is not limited to a dialup application or a browser application, and the communication component may be other communication component other than the modem. When the virtual machines run in different operating system environments, the above communication program and/or the proxy program may perform adaptive data format conversion when forwarding the communication request and/or parsed communication data, to adapt data differences between the operating systems of different virtual machines.

Embodiment 4

Figure 5:
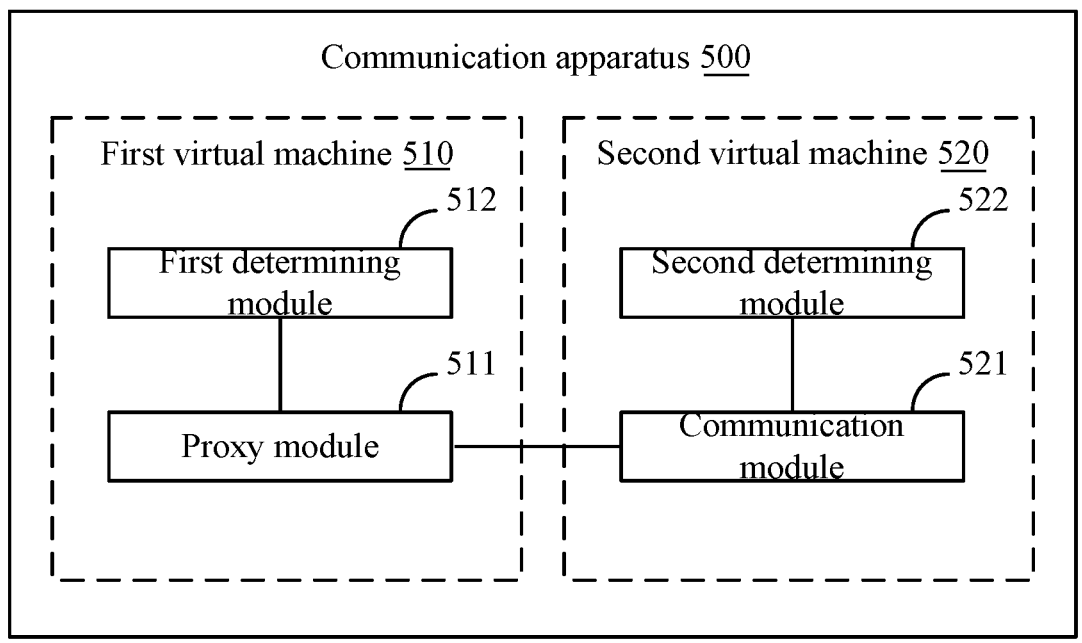
FIG. 5 illustrates a schematic structural diagram of a communication apparatus according to Embodiment 4 of the present application.

Based on the same inventive concept, this embodiment of the present application provides a communication apparatus. Since the principle based on which the apparatus solves the technical problem is similar to the principle used by the communication method, practice of the apparatus may be referenced to practice of the method. The duplicate portions are not described herein any further. FIG. 5 illustrates a schematic structural diagram of a communication apparatus 500 according to Embodiment 4 of the present application. As illustrated in FIG. 5, the communication apparatus 500 may include:

a proxy module 511, configured to acquire a communication request of a first virtual machine application; and a communication module 521, configured to package the communication request on a second virtual machine 520, and send the packaged communication request to a communication component; or a communication module 521, configured to receive communication data sent by a communication component, and parse the communication data on a second virtual machine 520; and a proxy module 511, configured to send the parsed communication data to a first virtual machine application.

Preferably, the communication module 521 is specifically configured to run a communication interface layer communication program on the second virtual machine 520 to package the communication request, and send the packaged communication request to the communication component having a first corresponding relationship with the communication interface layer communication program; or the communication module 521 is specifically configured to run a communication interface layer communication program on the second virtual machine 520 to parse the communication data, wherein the communication component has a first corresponding relationship with the communication interface communication program.

Preferably, the apparatus further includes:

a first determining module 512, configured to determine a second relationship between the first virtual machine application and the communication component, and determine, according to the second corresponding relationship and the first corresponding relationship, the communication interface layer communication program corresponding to the first virtual machine application; or a second determining module 522, configured to determine a second corresponding relationship between the first virtual machine application and the communication component, and determine, according to the second corresponding relationship and the first corresponding relationship, the first virtual machine application corresponding to the communication interface layer communication program.

Preferably, the determining a second relationship between the first virtual machine application and the communication component includes: determining the second corresponding relationship between the first virtual machine 510 and the communication component according to a predetermined third corresponding relationship between the first virtual machine and the communication component; or acquiring corresponding relationship selection information, and determining the second corresponding relationship between the first virtual machine application and the communication component according to the corresponding relationship information.

Preferably, the first virtual machine application runs in an Android operating environment, and the communication interface layer communication program is a radio interface layer daemon (RILD).

Embodiment 5

Based on the same inventive concept, this embodiment of the present application provides an electronic device for communication. Since the principle based on which the electronic device solves the technical problem is similar to the principle used by the communication apparatus, practice of the electronic device may be referenced to practice of the apparatus. The duplicate portions are not described herein any further.

The electronic device includes a communication component and the above described communication apparatus.

Embodiment 6

Based on the same inventive concept, this embodiment of the present application provides a program product for communication. Since the principle based on which the program product solves the technical problem is similar to the principle used by the communication method and apparatus and electronic device thereof, practice of the program product may be referenced to practice of the method. The duplicate portions are not described herein any further.

The computer program product includes a computer readable storage medium and a computer program mechanism embedded in the computer readable storage medium, wherein the computer program mechanism includes instructions for performing the following steps:

acquiring a communication request of a first virtual machine application, packaging the communication request on a second virtual machine, and sending the packaged communication request to a communication component; or receiving communication data sent by a communication component, parsing the communication data on a second virtual machine, and sending the parsed communication data to a first virtual machine application.

For ease of description, in the description, various parts of the above apparatuses are divided into various modules according to function for separate description. Nevertheless, the function of each module or unit is implemented in the same or a plurality of software and/or hardware when the present application is practiced.

Those skilled in the art shall understand that the embodiments may be described as illustrating methods, systems, or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon.

The non-transitory computer-readable storage medium includes, but not limited to, a disk memory, a CD-ROM, and an optical memory.

The present application is described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored in a non-transitory computer-readable memory capable of causing a computer or other programmable data processing devices to work in a specific mode, such that the instructions stored on the non-transitory computer-readable memory implement a product including an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although preferred embodiments of the present application are described, those skilled in the art may make modifications and variations to these embodiments based on the basic inventive concept of the present application. Therefore, the preferred embodiments and all such modifications and variations shall fall within the protection scope subject to the appended claims.

What is claimed is:

1. A communication method, comprising:
acquiring a communication request of a first virtual machine application, running a communication interface layer communication program on a second virtual machine to package the communication request, and sending the packaged communication request to a communication component having a first corresponding relationship with the communication interface layer communication program;
receiving communication data sent by the communication component, running the communication interface layer communication program on the second virtual machine to parse the communication data, and sending the parsed communication data to the first virtual machine application, wherein the communication component has the first corresponding relationship with the communication interface communication program;
wherein prior to the packaging the communication request on a second virtual machine, the method further comprises: determining a second relationship between the first virtual machine application and the communication component, and determining, according to the second corresponding relationship and the first corresponding relationship, whether the communication interface layer communication program has relationship to the first virtual machine application; and prior to the sending the parsed communication data to the first virtual machine application, the method further comprises: determining the second corresponding relationship between the first virtual machine application and the communication component, and determining, according to the second corresponding relationship and the first corresponding relationship, whether the first virtual machine application has relationship to the communication interface layer communication program.

2. The method according to claim 1, wherein the determining a second relationship between the first virtual machine application and the communication component comprises:

determining the second corresponding relationship between the first virtual machine application and the communication component according to a predetermined third corresponding relationship between the first virtual machine and the communication component;

or acquiring corresponding relationship selection information, and determining the second corresponding relationship between the first virtual machine application and the communication component according to the corresponding relationship information.

3. The method according to claim 1, wherein the first virtual machine application runs in an Android operating environment, and the communication interface layer communication program is a radio interface layer daemon (RILD).

4. An electronic device, comprising:
a communication component;
at least one processor; and
a memory communicably connected to the at least one processor; wherein
the memory stores instructions executable by the at least one processor, wherein, the instructions, when being executed by the at least one processor, cause the at least one processor to perform a communication method, the method comprising:
acquiring a communication request of a first virtual machine application, running a communication interface layer communication program on a second virtual machine to package the communication request, and sending the packaged communication request to a communication component having a first corresponding relationship with the communication interface layer communication program;
receiving communication data sent by the communication component, running the communication interface layer communication program on the second virtual machine to parse the communication data, and sending the parsed communication data to the first virtual machine application, wherein the communication component has the first corresponding relationship with the communication interface communication program;
wherein prior to the packaging the communication request on a second virtual machine, the method further comprises:
determining a second relationship between the first virtual machine application and the communication component, and determining, according to the second corresponding relationship and the first corresponding relationship, whether the first virtual machine application has relationship to the communication interface layer communication program; and prior to the sending the parsed communication data to the first virtual machine application, the method further comprises:

determining the second corresponding relationship between the first virtual machine application and the communication component, and determining, according to the second corresponding relationship and the first corresponding relationship, whether the first virtual machine application has relationship to the communication interface layer communication program.

5. The electronic device according to claim 4, wherein the determining a second relationship between the first virtual machine application and the communication component comprises:

determining the second corresponding relationship between the first virtual machine application and the communication component according to a predetermined third corresponding relationship between the first virtual machine and the communication component;

or acquiring corresponding relationship selection information, and determining the second corresponding relationship between the first virtual machine application and the communication component according to the corresponding relationship information.

6. The electronic device according to claim 4, wherein the first virtual machine application runs in an Android operating environment, and the communication interface layer communication program is a radio interface layer daemon (RILD).

7. A non-transitory computer readable storage medium storing instructions for performing a communication method, the method comprising:

acquiring a communication request of a first virtual machine application, running a communication interface layer communication program on a second virtual machine to package the communication reguest, and sending the packaged communication reguest to a communication component having a first corresponding relationship with the communication interface layer communication program;

receiving communication data sent by the communication component, running the communication interface layer communication program on the second virtual machine to parse the communication data, and sending the parsed communication data to the first virtual machine application, wherein the communication component has the first corresponding relationship with the communication interface communication program;

wherein prior to the packaging the communication reguest on a second virtual machine, the method further comprises:

determining a second relationship between the first virtual machine application and the communication component, and determining, according to the second corresponding relationship and the first corresponding relationship, whether the first virtual machine application has relationship to the communication interface layer communication program; and prior to the sending the parsed communication data to the first virtual machine application, the method further comprises:

determining the second corresponding relationship between the first virtual machine application and the communication component, and determining, according to the second corresponding relationship and the first corresponding relationship, whether the first virtual machine application has relationship to the communication interface layer communication program.

8. The non-transitory computer readable storage medium according to claim 7, wherein the determining a second relationship between the first virtual machine application and the communication component comprises:

determining the second corresponding relationship between the first virtual machine application and the communication component according to a predetermined third corresponding relationship between the first virtual machine and the communication component;

or acquiring corresponding relationship selection information, and determining the second corresponding relationship between the first virtual machine application and the communication component according to the corresponding relationship information.

9. The non-transitory computer readable storage medium according to claim 7, wherein the first virtual machine application runs in an Android operating environment, and the communication interface layer communication program is a radio interface layer daemon (RILD).

* * * * *